United States Patent
Matsuyama et al.

[11] Patent Number: 5,653,021
[45] Date of Patent: Aug. 5, 1997

[54] PRODUCTION PROCESS OF A PISTON

[75] Inventors: Hidenobu Matsuyama, Yokosuka; Kimio Nishimura, Sagamihara, both of Japan

[73] Assignee: Nissan Motor Co., Ltd., Kanagawa-ken, Japan

[21] Appl. No.: 612,522

[22] Filed: Mar. 8, 1996

[30] Foreign Application Priority Data

Mar. 13, 1995 [JP] Japan .................. 7-052155

[51] Int. Cl.$^6$ .................................. B23P 15/00
[52] U.S. Cl. .................. 29/888.049; 29/888.04; 92/222; 92/223; 219/121.66
[58] Field of Search .............. 29/888.049, 888.04; 219/121.6, 121.64, 121.66, 121.72, 121.85; 92/222, 223

[56] References Cited

U.S. PATENT DOCUMENTS

| | | | |
|---|---|---|---|
| 3,533,329 | 10/1970 | Galli | 92/222 |
| 4,074,616 | 2/1978 | Gale et al. | 92/222 |
| 4,125,926 | 11/1978 | Gale et al. | 29/888.049 |
| 4,233,490 | 11/1980 | Shalai et al. | 29/888.049 |
| 4,292,936 | 10/1981 | Morishita et al. | 29/888.049 |
| 4,387,627 | 6/1983 | Avezou | 219/121 |
| 4,562,327 | 12/1985 | Mielke | 29/888.049 |
| 5,505,171 | 4/1996 | Gazzard | 123/193.6 |
| 5,515,770 | 5/1996 | Clark et al. | 29/888.049 |

FOREIGN PATENT DOCUMENTS

| | | | |
|---|---|---|---|
| 61-41731 | 2/1986 | Japan . | |
| 63-318365 | 12/1988 | Japan . | |
| 2-27149 | 1/1990 | Japan . | |
| 2-125952 | 5/1990 | Japan . | |
| 2-308953 | 12/1990 | Japan . | |
| 2026649 | 2/1980 | United Kingdom | 29/888.049 |
| 8203814 | 11/1982 | WIPO | 29/888.049 |

*Primary Examiner*—Irene Cuda
*Attorney, Agent, or Firm*—Lowe, Price, LeBlanc & Becker

[57] ABSTRACT

To improve the abrasion resistance by increasing the ratio of copper content in the copper-type alloy layer on the periphery of the ring groove of a piston. A peripheral groove having a section of a roughly large trapezoidal shape larger than that of the ring groove is formed preliminarily on the outer peripheral face of the piston. While the powder of a copper-type alloy material is supplied to this peripheral groove, the laser beam is irradiated to melt the powder, and a thickening layers is thus formed. The thickening layer of a copper-type alloy is subjected to the machining process to form a ring groove for attaching the top ring,

4 Claims, 3 Drawing Sheets

PRODUCTION PROCESS OF A PISTON

BACKGROUND OF THE INVENTION

1. Field of the Invention

The present invention relates to a production process of a piston in the internal combustion engine, more particularly relates to a process for organizing composite structure of a portion in the vicinity of a ring groove where the piston ring is attached so as to improve the heat resistance and the abrasion resistance thereof.

2. Description of the Related Art

As such kind of production process of a piston, there is the one disclosed in Japanese Laid-Open Patent Publication No. Hei 2-125952.

In the art disclosed in Japanese Laid-Open Patent Publication No. Hei 2-125952, as shown in FIGS. 1A, 1B and 1C, a groove 13 is preliminarily formed on a portion which is an outer peripheral face 11a of a piston 11 comprising an aluminum alloy and where a ring groove 12 (see FIG. 1C) for attaching a piston ring is finally formed, and after a copper wire rod 14 is inserted and fitted to this groove 13, electron beam is irradiated thereto, thereby a melt diffusion layer 15 obtained as an aluminum-copper alloy layer is formed, then the melt diffusion layer 15 is subjected to the grooving process to form a ring groove 12 as shown in FIG. 1C.

According to the conventional method as described above, if the content of copper is increased for alloying with aluminum alloy which is a base material of the piston 11, a brittle intermetallic compound is formed between aluminum and copper. Therefore, the content of copper which is recognized to be more advantageous as it is increased, from the viewpoint of heat resistance and abrasion resistance, is limited to around 10 to 35%. Therefore, the matrix (base phase) of the melt diffusion layer 15 obtained as the aluminum-copper alloy layer as described above is basically aluminum-based, therefore cohesive abrasion is likely to be caused between the α phase and the piston ring made of cast iron, thus it has not necessarily been satisfactory from the viewpoint of abrasion resistance.

SUMMARY OF THE INVENTION

It is a primary object of the present invention to solve the foregoing problems and to provide a production process of a piston which improves the abrasion resistance by suppressing the occurrence of the cohesive abrasion with the piston ring.

The invention according to claim 1 is characterized in that it comprises a step to form a peripheral groove on an outer peripheral face of a piston comprising an aluminum alloy along the circumferential direction thereof; a step to form a thickening layer along the peripheral groove by irradiating a laser beam while continuously supplying powder of a copper-type alloy material to said peripheral groove, as well as relatively moving the piston and the laser beam to melt said powder; and a step to form a ring groove for attaching a piston ring by subjecting the thickening layer to the machining process after said thickening process.

The invention according to claim 2 is characterized in that the groove width and the groove depth of said peripheral groove are set to be larger than those of the ring groove, in addition to the structure of claim 1.

The invention according to claim 3 is characterized in that in addition to the structure of claim 1 or 2, said thickening process is carried out in plural number of times, assuming that a formation of a thickening layer on the whole periphery of the peripheral groove is counted as one.

The invention according to claim 4 is characterized in that in addition to the structure of claim 3, when said thickening process is carried out in plural number of times, the whole piston including the thickening layer is cooled for every process.

According to the invention of claim 1, since it has a thickening process by melting the powder of copper-type alloy material by the laser beam energy, an alloy layer having a copper content of not less than 70% and a copper-based matrix can be joined to the piston. Thereby, the cohesive abrasion with the piston ring can be suppressed, and particularly, the abrasion resistance can be greatly improved.

According to the invention of claim 2, since the groove width and the groove depth of the peripheral groove where the thickening layer of a copper-type alloy is formed are preliminarily set to be larger than those of the ring groove, a copper-type alloy layer is formed evenly on the periphery of the ring groove which is formed by subjecting the thickening layer to the machining process, thereby the abrasion resistance can be further improved.

According to the invention of claim 3, by carrying out the thickening process on the whole periphery of the peripheral groove in plural number of times, larger thickness of the thickening layer can be secured. And when it is intended to obtain a predetermined thickness by one thickening process, there may be caused a defect referred to as a "matrix delusion" that, for example, a portion having a small heat capacity on the matrix side is melt up to the matrix side upon fusion of the powder, thereby the matrix material is fused into the thickening layer. In the invention according to claim 3, however, there is not caused such an inconvenience.

According to the invention of claim 4, when said thickening process is conducted in plural number of times, the whole piston is cooled for every thickening process, thereby, for example, at the time of the second thickening process, it is not thermally affected by the previous thickening process, thus a defect such as the aforementioned matrix dilution on a portion where the heat capacity on the matrix side is small can be further prevented.

DETAILED DESCRIPTION OF THE PREFERRED EMBODIMENT

Figure 2A:
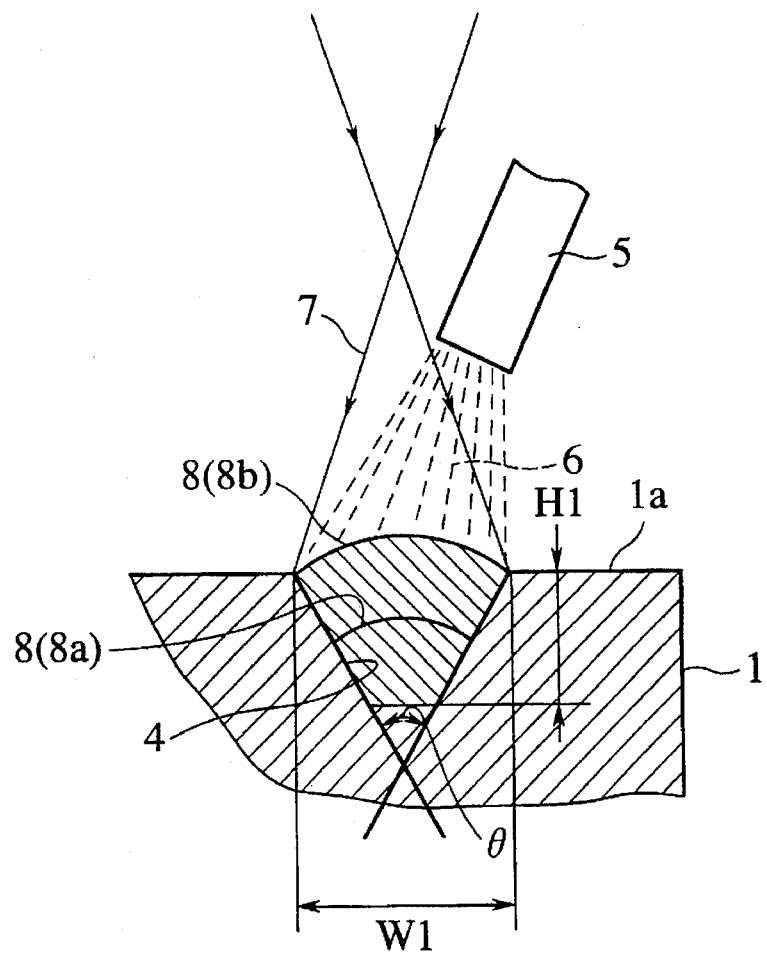
FIGS. 2A and 2B are views showing one embodiment of the present invention; 2A is an enlarged sectional view showing the main part at the time of thickening process, and 2B is an enlarged sectional view showing the main part after the ring groove is machined.
Figure 2B:
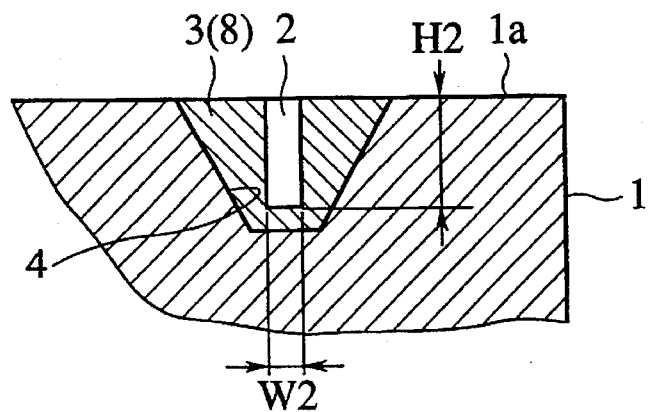
Figure 3:
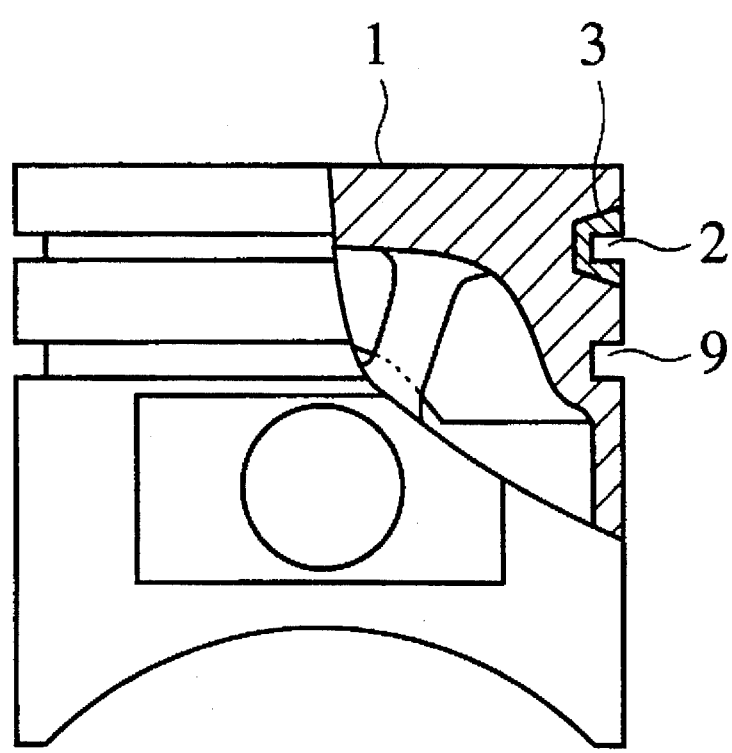
FIG. 3 is a partially broken diagram showing the whole piston obtained by the process according to the present invention.

FIG. 2A and 2B are views showing one embodiment of the present invention and show the case where a copper-type alloy layer 3 is formed on the periphery of a ring groove 2 to which a top ring of a piston 1 is attached.

As shown in FIGS. 2A and 2B, a peripheral groove 4 having a section of a roughly trapezoidal shape is formed on the portion where a ring groove 2 for the top ring is formed on the outer peripheral face 1a of the piston 1, along the peripheral direction thereof.

The piston 1 is positioned and fixed to the jig not shown, and while the powder 6 of a copper-type alloy material is continuously supplied from a powder-supply nozzle 5 to the peripheral groove 4 to fill the peripheral groove 4 with the powder 6, a laser beam 7 is irradiated from above said powder 6, and simultaneously the piston 1 is rotated at a predetermined speed making the axial center as the rotation center, thus the piston 1 and the laser beam 7 are rotated relative to each other.

Thereby, after melting the powder 6 filled in the peripheral groove 4 with the laser beam energy, the powder is solidified to form a thickening layer 8 of a copper-type alloy along the peripheral groove 4.

Figure 1A:
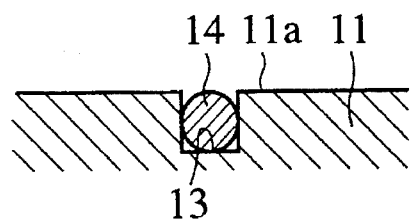
FIGS. 1A, 1B and 1C are process diagrams showing one embodiment of the conventional production process of a piston.
Figure 1B:
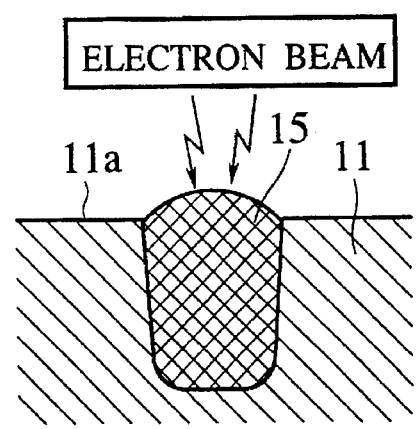
Figure 1C:
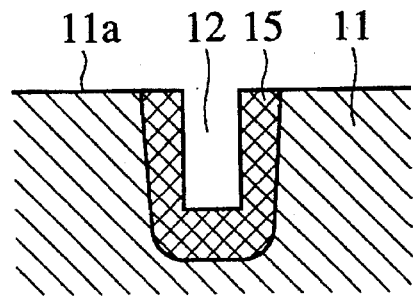

Thereafter, the thickening layer 8 is sufficiently cooled, subjected to the machining process, and cut to be a copper-type alloy layer 3 so that the thickening layer 8 becomes the same plane with the outer peripheral face 1a of the piston 1, and at the same time, a ring groove 2 is cut on the copper-type alloy layer 3 as shown in FIGS. 1 and 2. In addition, it is a matter of course that a ring groove 9 for the second ring is simultaneously cut in the piston 1.

In the present embodiment, a peripheral groove 4 having a section of a roughly trapezoidal shape with a groove width $W_1$ of 7.5 mm, a groove depth $H_1$ of 4.5 mm, and an open tip angle $\theta$ of 60° was formed on the outer peripheral face 1a of the piston 1 made of aluminum alloy comprising AC8C material (JIS standard). Then, while continuously supplying the aluminum bronze powder at a rate of 50 g/min. from the powder supply nozzle to the peripheral groove 4, a laser beam 7 having a laser output of 4.0 kW was irradiated to conduct the thickening process, thus a thickening layer 8 was formed. The aluminum bronze powder used here had a composition of, for example, Al—10%, Ni—5%, Fe—3% and Cu—the balance.

The laser beam 7 was so formed that the shape at the irradiation position became a rectangle of 7.5 mm×2 mm, and was so irradiated that the longer sides thereof coincide with the direction of the groove width of the peripheral groove 4.

The above-mentioned thickening process was conducted twice, and the whole piston 1 including the thickening layer 8 was sufficiently cooled after the first thickening process and before the start of the second thickening process. In addition, as shown in FIG. 2A, the thickening layer by the first process is shown by a reference numeral 8a and the thickening layer by the second process is shown by 8b.

Thereafter, cutting process was performed so that the thickening layer 8 had the same plane with the outer peripheral face 1a of the piston 1 to make a copper-type alloy layer 3, and a ring groove 2 having a groove width $W_2$ of 1.5 mm and a groove depth of $H_2$ of 3.5 mm was formed in this copper-type alloy layer 3.

As a result, an uniform copper-type alloy layer 3 without any defect such as matrix dilution could be formed in the periphery of the ring groove 2, and it was confirmed that it could contribute largely to the improvement of the abrasion resistance.

What is claimed is:

1. A production process of a piston comprising the steps of:

forming a peripheral groove on an outer peripheral face of a piston comprising an aluminum alloy along the circumferential direction thereof;

forming a thickening layer along the peripheral groove by irradiating a laser beam while continuously supplying powder of a copper-type alloy material to said peripheral groove, as well as relatively moving the piston and the laser beam to melt said powder; and forming a ring groove for attaching a piston ring by subjecting the thickening layer to the machining process after said thickening process.

2. A production process of a piston according to claim 1, wherein said peripheral groove is set to be larger than the ring groove in the groove width and in the groove depth.

3. A production process of a piston according to claim 1, wherein said thickening process is carried out a plural number of times, assuming that a formation of a thickening layer on the whole periphery of the peripheral groove is counted as one.

4. A production process of a piston according to claim 3, wherein when said thickening process is carried out a plural number of times, the whole piston including the thickening layer is cooled for every process.

* * * * *